(No Model.)

E. M. COLE.
TOOL FOR SHOEMAKING.

No. 541,918.    Patented July 2, 1895.

WITNESSES:
B. A. Mahony
Lillian A. Redfield

INVENTOR
Edward M. Cole
BY
Casper L. Redfield
ATTORNEY.

UNITED STATES PATENT OFFICE.

EDWARD M. COLE, OF CHICAGO, ILLINOIS.

TOOL FOR SHOEMAKING.

SPECIFICATION forming part of Letters Patent No. 541,918, dated July 2, 1895.

Application filed November 3, 1894. Serial No. 527,822. (No model.)

*To all whom it may concern:*

Be it known that I, EDWARD M. COLE, a citizen of the United States, residing at Chicago, in the county of Cook and State of Illinois, have invented certain new and useful Improvements in Tools for Shoemaking, of which the following is a specification.

My invention relates to the manufacture of cork-sole shoes, and has for its object the construction of a tool that will groove, size and burnish the cork-welt.

Figure 1:
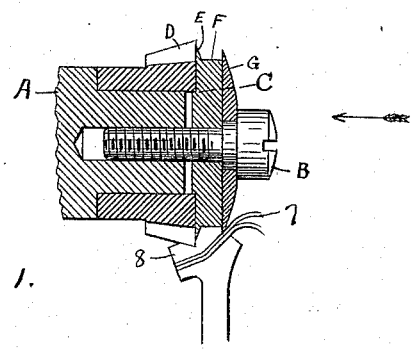
Figure 2:
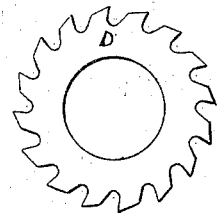
Figure 3:
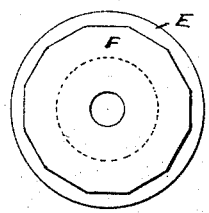
Figure 4:
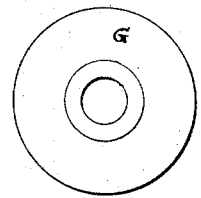

In the accompanying drawings, Figure 1 is a section of the tool in working position. Figs. 2, 3, and 4 are details of the several parts looking in the direction of the arrow in Fig. 1.

The tool consists of a cutter D, a polygonal burnisher F having a disk like shield E, and a smooth gaging or guiding disk G. These parts are secured to a revolving spindle A by means of the screw B. The cutter D is similar in form and construction to other cutters in common use for a variety of purposes and is more particularly illustrated in Fig. 2. The burnisher F, as shown in Fig. 3, has a number of small flat sides. The corners where these sides join are never quite sharp but are slightly blunted as they would appear after they are worn somewhat. A thin edge E, on this burnisher is circular and extends out like a flange for forming a shield to prevent the teeth of the cutter from tearing the leather beyond the place of cutting and to protect the stitching from the cutter. A small boss C on the end of the burnisher F enters the opening through the cutter D and serves to keep the two central. At the outside of the burnisher F is a disk G that serves to guide the shoe in the hands of the operator and to determine the size and width of face of the cork-welt. A screw B serves to secure the several parts to the spindle A.

The operation is as follows: The tool having been secured in position and caused to rotate by any ordinary means, the operator takes the shoe, when prepared for this operation, and presses it against the tool in such a manner as to cause the edge of the disk G to enter the joint between the cork-welt 8 and the casing 7, and slides it along with the disk G as a guide. In doing this the cutter D makes a channel in the cork-welt and the burnisher F polishes the face with which it comes in contact.

What I claim is—

1. In a tool for operating upon a cork-welt, a rotary cutter, a guiding disk for determining the location of the cut, and a burnishing device between said cutter and said disk.

2. In a tool for operating upon a cork-welt, a rotary cutter for grooving said cork-welt, a burnisher for polishing the face adjacent to said groove, and a shield between said cutter and said burnisher.

3. A rotary cutter for grooving a cork-welt, a shield adjacent to said cutter and serving to protect one edge of the cork-welt therefrom, a burnishing device for polishing the face of the cork-welt adjacent to the protected edge, and a guiding disk serving to locate the groove made by the cutter and the width of the burnished face.

EDWARD M. COLE.

Witnesses:
JOHN S. STERLING,
THOS. B. BROWN.